(12) United States Patent
Koxholt et al.

(10) Patent No.: US 8,216,628 B2
(45) Date of Patent: Jul. 10, 2012

(54) PROCESS FOR PURIFYING STARCHES

(75) Inventors: Maximilian Koxholt, Franklin Park, NJ (US); Paul A. Altieri, Belle Mead, NJ (US); Rodger T. Marentis, Macungie, PA (US); Peter T. Trzasko, Plainsboro, NJ (US)

(73) Assignee: Corn Products Development, Inc., Westchester, IL (US)

( * ) Notice: Subject to any disclaimer, the term of this patent is extended or adjusted under 35 U.S.C. 154(b) by 1920 days.

(21) Appl. No.: 10/234,087

(22) Filed: Aug. 30, 2002

(65) Prior Publication Data

US 2003/0049366 A1    Mar. 13, 2003

Related U.S. Application Data

(60) Provisional application No. 60/317,572, filed on Sep. 6, 2001.

(51) Int. Cl.
    *A23L 1/05* (2006.01)
(52) U.S. Cl. ......... 426/661; 426/312; 426/426; 426/658
(58) Field of Classification Search .................. 426/312, 426/425, 429, 658, 661
    See application file for complete search history.

(56) References Cited

U.S. PATENT DOCUMENTS

| | | | |
|---|---|---|---|
| 4,427,707 A | 1/1984 | Heine et al. | 426/312 |
| 4,675,198 A | 6/1987 | Sevenants | 426/425 |
| 5,104,587 A * | 4/1992 | Besserman et al. | 554/175 |
| 5,151,188 A * | 9/1992 | Hopper et al. | 210/634 |
| 5,264,236 A | 11/1993 | Ogasahara et al. | |
| 5,294,453 A | 3/1994 | Quarles et al. | 426/548 |
| 5,756,721 A | 5/1998 | Eden et al. | |
| 5,977,348 A | 11/1999 | Harris et al. | 536/107 |
| 6,197,356 B1 | 3/2001 | Girsh | |

FOREIGN PATENT DOCUMENTS

| | | |
|---|---|---|
| EP | 0 554 818 | 8/1993 |
| JP | 62181747 | 8/1987 |
| JP | 2069149 A | 3/1990 |
| JP | 03 127961 | 5/1991 |
| JP | 3137903 A | 6/1991 |
| JP | 03250001 | 11/1991 |
| JP | 4173082 A | 6/1992 |
| JP | 6007200 A | 1/1994 |

OTHER PUBLICATIONS

Wu, V. Victor et al., Evaluation of Corn Gluten Meal Extracted with Supercritical Carbon Dioxide and Other Solvents: Flavor and Composition, Cereal Chem., 1994, pp. 217-219, vol. 71, No. 3.
Nihon Sanso Technical Report No. 6, 1988, pp. 12-18.
Young, Donald F.; Munson, Bruce R.; and Okiishi, Theodore H., "A Brief Introduction to Fluid Mechanics", p. 1-2.
Sax, N. Irving and Lewis,Sr., Richard J.; "Hawley's Condensed Chemical Dictionary" Eleventh Edition, p. 529,1110.
McHugh, Mark A. and Krukonis, Val J.; "Supercritical Fluid Extraction Principles and Practice", 2nd Edition, pp. 1-16.
Maheshwari, P., Ooi, E.T., and Nikolov, Z.I.; "Off-Flavor Removal from Soy-Protein Isolate by Using Liquid and Supercritical Carbon Dioxide", JAOCS, vol. 72 No. 10, 1995, pp. 1107-1114.

* cited by examiner

*Primary Examiner* — Leslie Wong
(74) *Attorney, Agent, or Firm* — Karen G. Kaiser

(57) ABSTRACT

The present invention relates to a process for purifying starches. More particularly, the invention relates to a method of removing off-flavors, off-odors, and off-colors from starches by extraction of the components causing the off-flavors, off-odors, and off-colors with a fluid in the supercritical or liquid phase.

11 Claims, 7 Drawing Sheets

PROCESS FOR PURIFYING STARCHES

The priority of provisional application 60/317,572, filed Sep. 6, 2001 is claimed under 35 USC §119(e).

FIELD OF THE INVENTION

This invention relates to a process for purifying starches, and more particularly, to a method of removing off-flavors, odors and colors from starches by extraction with a fluid in the supercritical or liquid phase.

BACKGROUND OF THE INVENTION

Starch, and particularly modified starch, is used in foods to contribute to physical properties, such as, texture, viscosity, gel formation, adhesion, binding, moisture retention, film formation and homogeneity. However, it is undesirable for starch to affect the taste, odor, or color of the foods in which it is used.

The starch base, the milling process, and the type of chemical modification of the starch can all affect the sensory qualities of starch, for example, by imparting an unwanted flavor, odor, or color, or by masking the typical flavor of the food. Cereal-based starches, such as corn starch and wheat starch, are sometimes considered to have off-notes described as "cardboard- or cereal-like." Root and tuber starches, such as tapioca and potato starch, are usually judged to be cleaner in flavor, but retain flavors characteristic of the starch and mask the flavor of the food. Residual protein and lipid that are not entirely extracted during the milling process can influence starch flavor.

Modification of the starch base can also affect flavor, impart unsuitable odors, and darken the color of the starch through the retention of residual components from the modification processing. Suspected components include hexanal, 2-heptanone, heptanal, trimethylbenzene, nonanal, BHT-aldehyde, and acetic acid.

Accordingly, there is an ongoing need for a method of purifying starches, especially food starches, to remove those components that cause unwanted tastes, odors and colors.

SUMMARY OF THE INVENTION

This invention is a process for extracting volatile components from starch comprising: (i) contacting the starch with a supercritical fluid or liquid phase fluid for a sufficient length of time and at a sufficient temperature and pressure effective to dissolve the components in the supercritical fluid or liquid phase fluid without substantially changing the physical structure of the starch; and (ii) removing the supercritical fluid or liquid phase fluid with the dissolved components.

The volatile components are typically low and medium weight organic compounds (although higher molecular weight volatiles can also be removed by this process, as can some non-volatile materials) that are residual in the starch, either as inherent components of the starch or introduced via milling or modification processes. In most cases, the extracted components belong to the class of volatile aldehydes, ketones, esters and organic acids, although other volatile organic compounds are included in those that can be removed by this process. Starch purified via the process of this invention is characterized by a reduction of those components as compared to the corresponding unpurified base starch and has improved taste, odor or color.

DETAILED DESCRIPTION OF THE INVENTION

A fluid is defined to be a substance that deforms continuously when acted on by shearing stress of any magnitude (D. F. Young et al., 1997. A Brief Introduction to Fluid Mechanics, John Wiley & Sons, Inc., New York, page 1).

Figure 1:
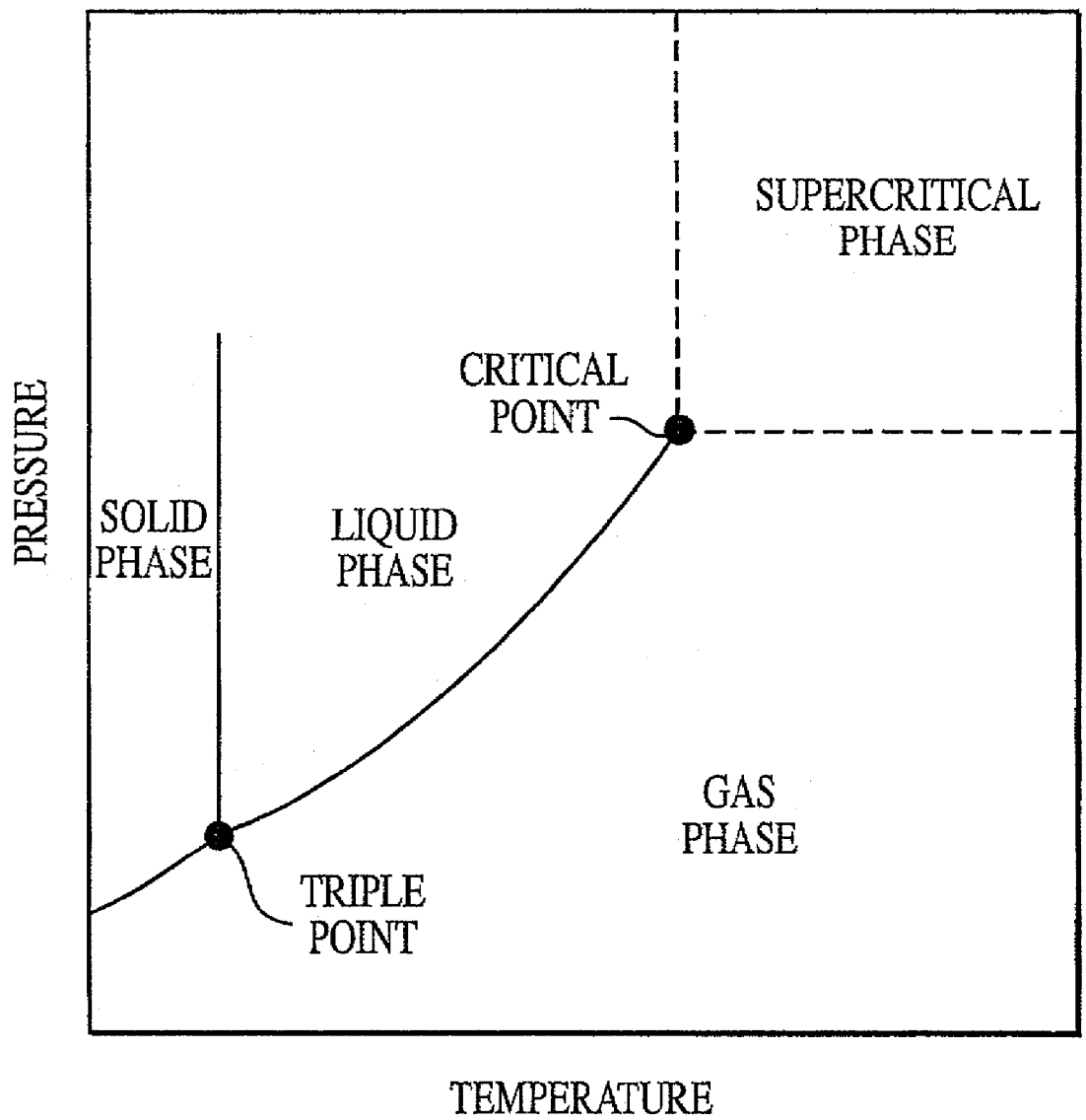
FIG. 1 is a qualitative illustration of a phase diagram depicting the critical point, the liquid phase and supercritical phase of a fluid.

A supercritical fluid can be defined to be a dense gas that is maintained above its critical temperature, the temperature at which it cannot be liquified by pressure. (Hawley's Condensed Chemical Dictionary, Eleventh Edition, Van Nostrand Reinhold, New York.) FIG. 1 depicts a qualitative phase diagram for a supercritical fluid, which illustrates that a fluid is in a supercritical state when both its temperature and pressure are above the critical temperature and pressure.

Supercritical fluids are known to possess a liquid-like density over much of the range of industrial interest; exhibit gas-like transport properties of diffusivity and viscosity; and have very low surface tension allowing facile penetration into microporous materials, making them versatile extraction materials (M. McHugh et al., 1993, Supercritical Fluid Extraction, $2^{nd}$ edition, Butterworth-Heinemann Newton, Mass., p. 14).

A variety of fluids, including, but not limited to, $CO_2$, propane, isopropanol, ammonia, or water can be used as supercritical fluids for extraction. The critical temperatures of these fluids can vary by several hundred degrees Celsius, making their usefulness dependent on specific applications and considerations. From a physical safety consideration, it is preferred to work with a nonflammable fluid having a critical point under or near ambient temperature. For use with food products, it is preferred to work with an inert nontoxic fluid.

This invention comprises a process in which a supercritical or liquid phase fluid is used to remove components from starch, which components cause unwanted tastes, odors or colors in the starch. A preferred supercritical fluid for this use is carbon dioxide, as it is generally recognized as safe (GRAS) for use with food products, it has a critical temperature of 31.1° C., a critical pressure of 73.8 bars (7.38 MPa), leaves no chemical residue, can be recycled, contains only trace amount of oxygen, and is inexpensive.

Three particularly useful methods of conducting a supercritical fluid extraction are identified as the solid matrix, countercurrent column, and completely mixed vessel extraction methods. The process conditions may vary from method to method, but will be such that the extraction fluid is either in a supercritical or liquid phase, and the contact time, temperature and pressure will be effective to dissolve the components in the supercritical fluid or liquid phase fluid without substantially changing the physical structure of the starch.

The target processing conditions are the combination of the lowest temperature and pressure, and solvent-to-feed-ratio, at which the components in the starch causing off-flavor/off-odor/off-color are extracted. The target conditions are limited by the ability of the starch to retain its structural integrity and desirable properties, for example, ability to become viscous, to gell, and to form film. Those skilled in the art of starch processing will know the limits of the processing parameters that will cause a particular starch to lose its structural integrity. In general, it has been found by the inventors those processing limitations will not restrict the inventive process for extracting with a supercritical or liquid phase fluid.

Pressures above 300 bar (30.0 MPa), temperatures in the range of 50° to 120° C., and a solvent-to-feed ratio of 1 to 10 are particularly effective; more effective are pressures above 600 bar (60.0 MPa).

Figure 2:
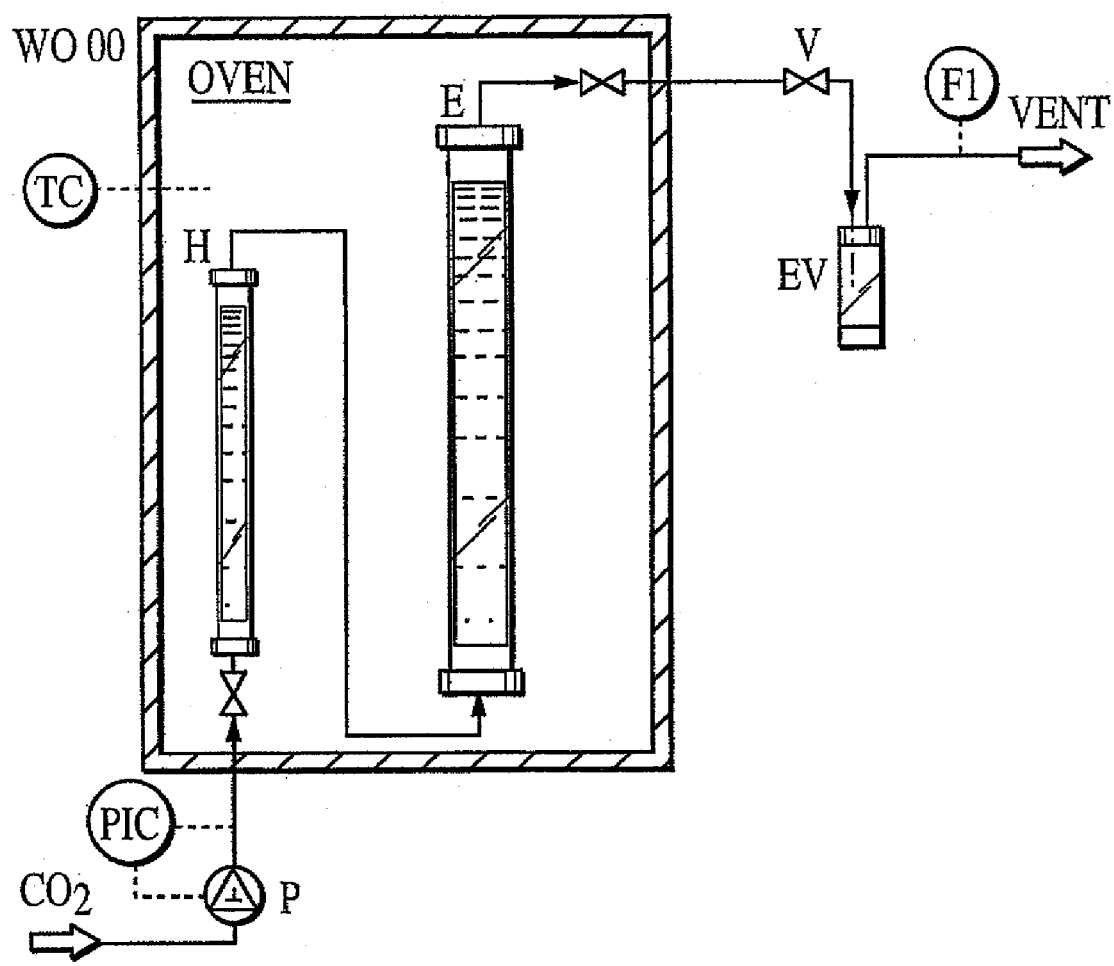
FIG. 2 is a diagram of a solid matrix extraction system.

FIG. 2 shows the experimental setup for the solid matrix extraction method. The extraction unit consists of a pump (P) and an oven equipped with a pre-heater (H), an extraction vessel (E), a gas regulating valve (V) and an extract collection vial (EV).

The starch to be purified is tightly packed in the extraction vessel and placed in the oven. The oven is closed and heated to the extraction temperature. Pre-heated $CO_2$ is pumped into the vessel, with the $CO_2$-flow regulating valve (V) closed, until the target processing conditions are reached.

For a laboratory scale, a sequential series of static and dynamic extractions are performed. During static extraction the $CO_2$-flow regulating valve (V) is closed to ensure interaction of the supercritical $CO_2$ with the base starch. For the dynamic extraction step the $CO_2$-flow regulating valve (V) is open to ensure a constant flow of supercritical $CO_2$. The resultant supercritical $CO_2$ solutes are transported out of the vessel with the supercritical $CO_2$ and collected in the extract vial.

A practitioner of ordinary skill in the art understands the procedures and equipment necessary to transform the above process using experiment scale apparatus into a commercial-scale process.

Figure 3:
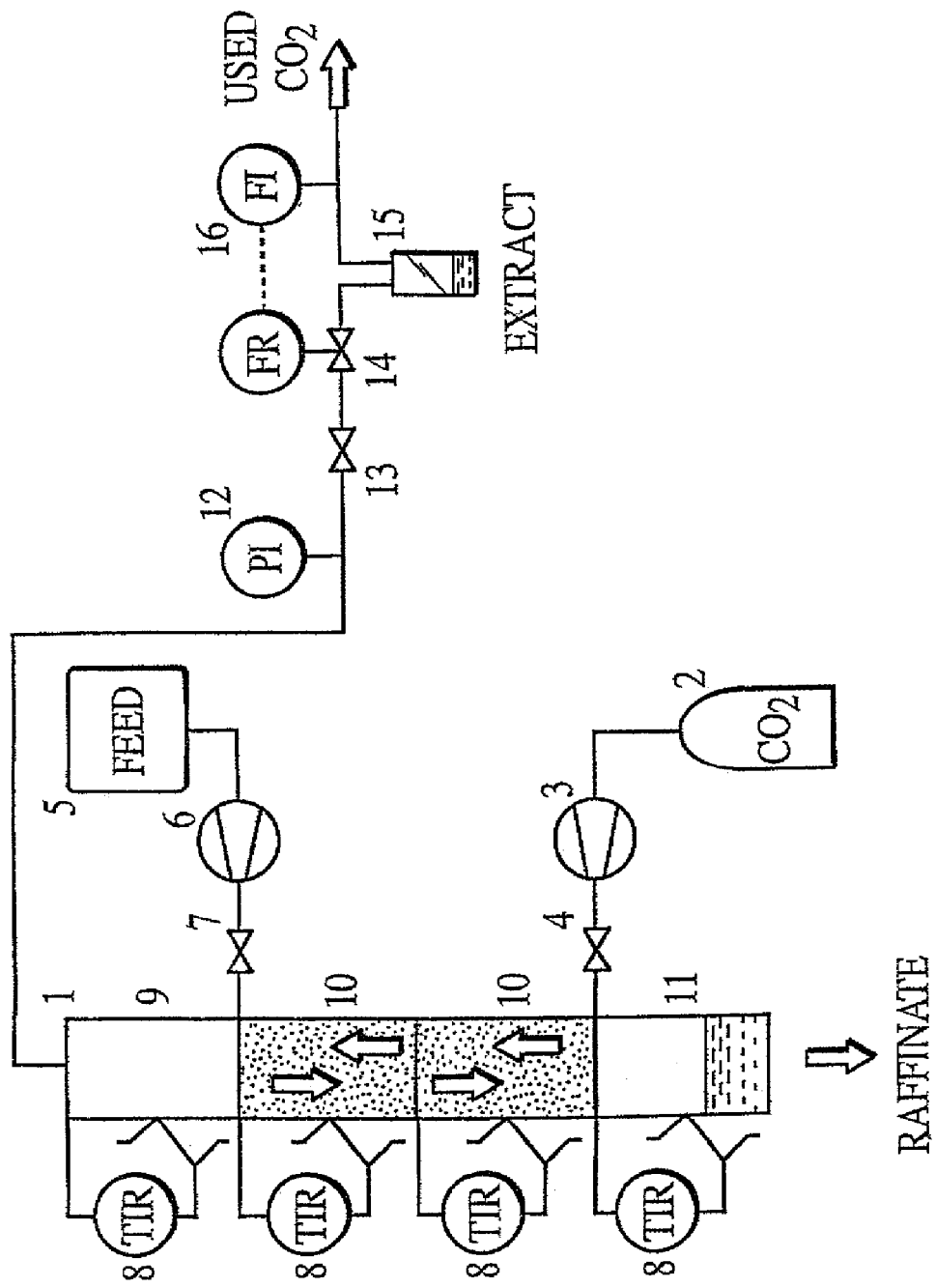
FIG. 3 is a diagram of a column supercritical fluid extraction system.

FIG. 3 shows the countercurrent column extraction apparatus, wherein 1 is the countercurrent column; 2 is the $CO_2$ cylinder; 3 is the $CO_2$ pump; 4 is the $CO_2$ regulating valve; 5 is the slurry feed tank; 6 is the slurry pump; 7 is the regulating valve for slurry feed; 8 is the temperature controller for column heating; 9 is the column head space with off-compounds containing $CO_2$; 10 is the column with random packing (extraction area); 11 is the bottom of column with purified slurry; 12 is the pressure sensor; 13 is a valve; 14 is the flow regulator valve; 15 is the extract collection container; and 16 is the $CO_2$ flow sensor. A slurry containing the starch to be purified is introduced into the top of the vertically oriented extraction column (FIG. 3, 1). At the same time, the supercritical fluid is introduced from the bottom of the column (FIG. 3, 11). The column contains an internal contacting device, a random packed bed (FIG. 3, 10), which ensures that the supercritical fluid and the starch slurry are dispersed throughout the column.

There must be a sufficient differential in densities between the starch slurry and supercritical fluid so that the starch slurry will move downward while the supercritical fluid travels upward in the column. The supercritical fluid then extracts the slurry while traveling up the column. One skilled in the art will be able to adjust the combination of temperature and pressure to obtain an adequate differential in the densities.

In some circumstances extraction with a supercritical fluid will cause the starch to be purified to gelatinize. For example, depending upon the starch modification and amylose content, under the high moisture content of the slurry conditions (typically 20-50% solids), some starches gelatinize between 40 and 70° C. In such cases, extraction can be accomplished with a liquid phase fluid, which is not in a supercritical state, at an effective temperature and pressure as defined by FIG. 1. A particularly useful temperature and pressure combination for a liquid phase $CO_2$ counter current method extraction of a stabilized crosslinked starch is 20° C. and 105 bar (10.5 MPa). A practitioner of ordinary skill in the art is able to manipulate the temperature and pressure so as to accommodate the physical limitation of the starch to be processed with the liquid phase fluid.

An additional method that may be used to extract unwanted components from a starch is a completely mixed vessel extraction system. In this system, the starch slurry is continuously mixed in a pressurized and heated vessel while the supercritical or liquid phase fluid is pumped into the vessel. The supercritical or liquid phase fluid is dispersed throughout the slurry, collected and removed, typically at the top of the vessel.

It may be desirable to introduce a co-solvent including, without limitation, ketones or alcohols, to improve the extraction of certain starches. A particularly useful co-solvent for food or food additive applications is ethanol. If a co-solvent is employed it must be pumped into the system and mixed with the supercritical or liquid phase fluid before that fluid enters the extraction vessel or countercurrent column. To obtain sufficient mixing of the two solvents, the co-solvent can be pumped directly into the main extraction fluid inlet of the system. Alternatively, the co-solvent can be mixed with the main extraction fluid via a mixing device and then pumped into the appropriate apparatus.

All starches and flours (hereinafter "starch") are suitable for use as the starch to be purified ("the base starch"). The starch may be derived from any native source, that is, as it is found in nature. The starch may be derived from a plant obtained by standard breeding techniques, including cross-breeding, translocation, inversion, transformation, or any other method of gene or chromosome engineering used to introduce variations into the starch. A starch derived from a plant grown from artificial mutations and variations produced by known standard methods of mutation breeding may also be purified by the inventive process.

Typical native sources for the base starches are cereals, tubers, roots, legumes and fruits, such as, corn, pea, potato, sweet potato, banana, barley, wheat, rice, sago, amaranth, tapioca, arrowroot, canna, sorghum, and waxy or high amylose varieties of those. The term "waxy" is intended to include a starch or flour containing at least about 95% by weight amylopectin, and the term "high amylose" is intended to include a starch or flour containing at least about 40% by weight amylose.

Chemically modified starches may be used as the base starch, and include, but are not limited to, crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives. Procedures for modifying starches are well-known and described, for example in *Modified Starches: Properties and Uses*, Ed. Wurzburg, CRC Press, Inc., Florida (1986).

Physically modified starches may be used as the base starch and include, but are not limited to, thermally inhibited and pregelatinized starches. Procedures for preparing thermally inhibited starches are disclosed, for example, in U.S. Pat. No. 6,221,420, and references disclosed therein. Processes for preparing pregelatinized granular starches are disclosed in U.S. Pat. No. 4,280,851, U.S. Pat. No. 4,465,702, U.S. Pat. No. 5,037,929, and U.S. Pat. No. 5,149,799.

The purified starches of the present invention may be used in those products in which starch is traditionally used to provide products having less off-flavor, off-odor and off-color. These products include, but are not limited to, foods, papers, detergents, films, personal care products, pharmaceuticals, and nutraceuticals. The purified starches are particularly useful in foods including, but not limited to, gravies, soups, fruit preparations and sauces, dressings (such as, salad dressings), food fillings, sauces, condiments, and dairy products (such as yogurts, vlas, puddings and sour cream).

The following test methods and examples are presented to further illustrate and explain the present invention and should not be taken as limiting in any regard. The invention is to be limited only by the terms of the appended claims, along with the full scope of equivalents to which such claims are entitled. All parts and percentages are given by weight and all temperatures in degrees Celsius (° C.) unless otherwise noted.

TEST METHODS

Gas Chromotography—Mass Spectrometry (GC/MS): GC/MS was used to identify volatile off-flavors and off-odors. Starch (5.0 g) was placed in the instrument's glass tube and heated to 85° C. for 30 minutes with a constant flow of helium at 20 mL/min. The volatile species were collected in a trap containing an absorbent material. The trap was placed in-line with the GC/MS unit and heated to 250° C. The volatile organic compounds were released and collected onto the head of the GC column and the components were separated and identified using GC/MS. To quantify the components a calibration run was performed and the relevant peak area of the chromatogram was integrated.

Spectrocolorography: A Hunter ColorQUEST spectrocolorimeter sphere model (commercially available from Hunter Associates Laboratory, Inc., Reston, Va.) equipped with an NIR compression cell with quartz window (commercially available from Bran-Luebbe, Inc., Buffalo Grove, Ill.) was used to measure color according to the manufacture's instructions using the following parameters: Scale=b (yellow), Observer angle=10, Illuminant=D65, Reflectance setting=RSIN, Viewing area Size=LAV and Ultraviolet Filter=out.

Taste and Flavor Tests: Taste and flavor tests were performed by two panels on a 6.6% by weight starch slurry that was cooked for twenty minutes and then cooled. The two test panels were a small expert panel, and a large panel using the Triangle Test method.

The small expert panel consisted of 5 to 6 persons experienced in detecting off-flavor components in a starch. A starch containing off-flavor components was defined for purposes of the test to be a starch in which the flavor of the starch, or the flavor of a food containing the starch, is rated as not "clean" tasting by at least 50% of the expert panelists.

The large panel used the Triangle Test conducted according to the procedures described in *Sensory Evaluation Techniques* (Meilgaard, Civille, Carr, 2nd Edition, Chapter 6, Section IIa, pgs 47-52, and Appendix T7, pg 251 CRC Press Inc., Boca Raton, Fla., 1987). A panelist was given three samples, two samples of which were always identical, and asked to identify the odd sample. If able to do so, the panelist was then asked to comment on relative "cleaness" of taste between the samples. The level of significance of correct responses for the clean sample was determined in a subsequent statistical evaluation. A significance level of greater than 90% was required to indicate a "clean" sample.

Example 1

Preparation of a purified stabilized and crosslinked starch derivative. A stabilized and cross-linked waxy corn starch (351.61 g), (THERMFLO® Starch, commercially available from National Starch and Chemical, Bridgewater, N.J., US) was loaded in the 600 ml extraction vessel of the supercritical $CO_2$ extraction unit (model Spe-ed SFE, Applied Separations Co.). The starch was then pre-heated to 80° C. and $CO_2$ was pumped into the vessel until a pressure of 620 bar was attained. The exact process details for the subsequent static and dynamic extractions are given in Table 1.

TABLE 1

Static and Dynamic Extraction Process Details

| Time [min] | $CO_2$ flow [l/min] | Temperature [° C.] | Pressure [bar] | Cumulated extract [g] |
|---|---|---|---|---|
| 0 | 9 | 80 | 620 | 0.00 |
| 5 | Static | 80 | 620 | 0.10 |
| 15 | 6 | 80 | 620 | |
| 23 | Static | 80 | 620 | |
| 33 | 5 | 80 | 620 | |
| 41 | Static | 80 | 620 | |
| 51 | 5 | 80 | 620 | 0.23 |
| 58 | Static | 80 | 620 | |
| 68 | 5 | 80 | 620 | |
| 71 | 5 | 80–100 | 656 | 0.24 |
| 75 | Static | 100 | 656 | |
| 85 | 5 | 100 | 656 | |
| 90 | — | 100 | 656 | 0.25 |
| 90–110 | Depressurize | 100 | 0 | 0.32 |

Based on these operating conditions, the overall solvent to feed ratio was 1.23. The collected extract was yellow and exhibited the off-odor detected in the base starch.

The color of the base starch and the purified starch were measured using the spectrocolorimeter under the conditions described in the test protocol above in this specification. Measurements revealed that the purified starch exhibited an improvement of 0.62 in the b-value demonstrating that the purified starch was less yellow.

Figure 4:
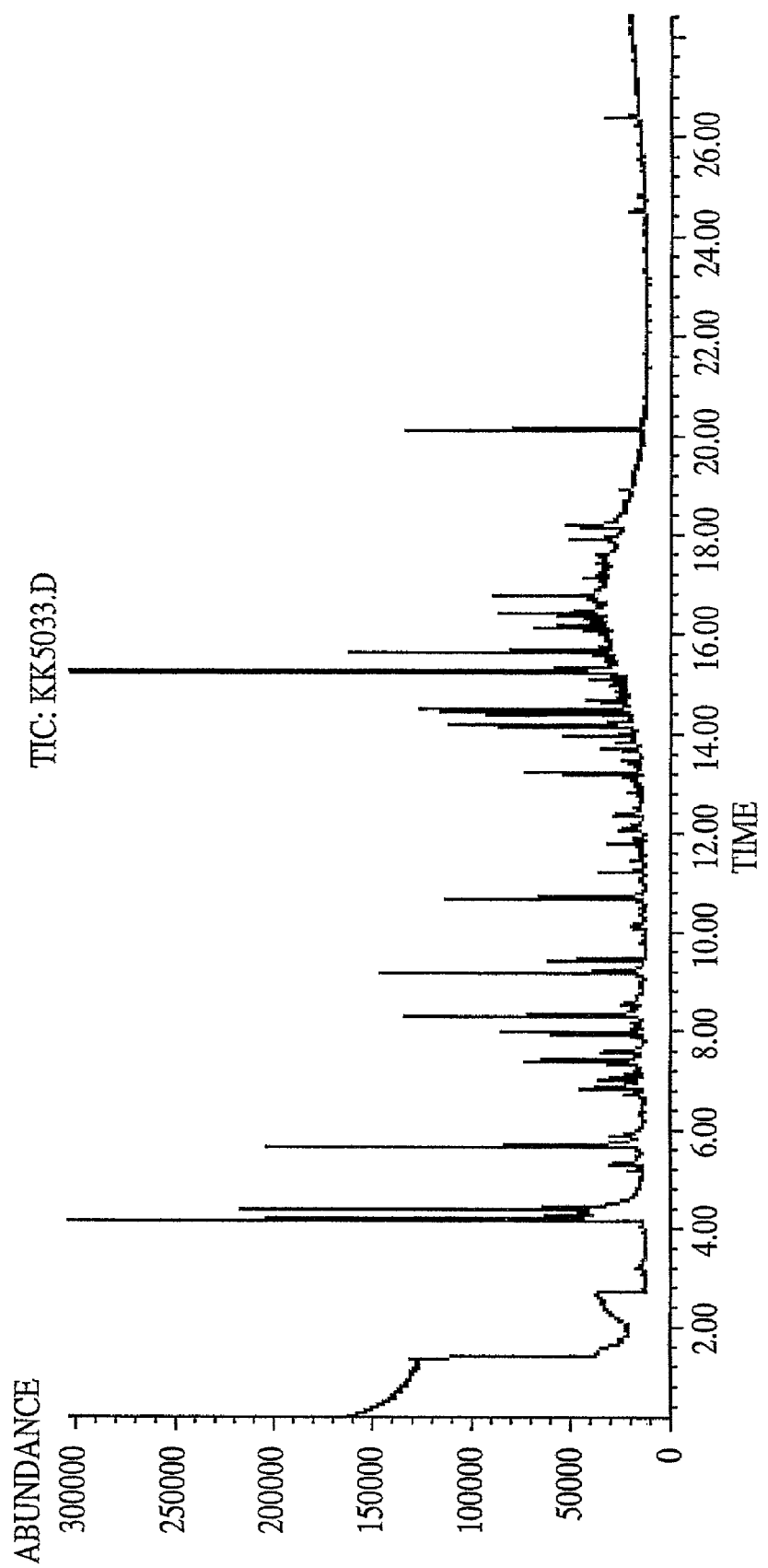
FIG. 4 is a GC/MS graph of a stabilized and cross-linked waxy corn starch.
Figure 5:
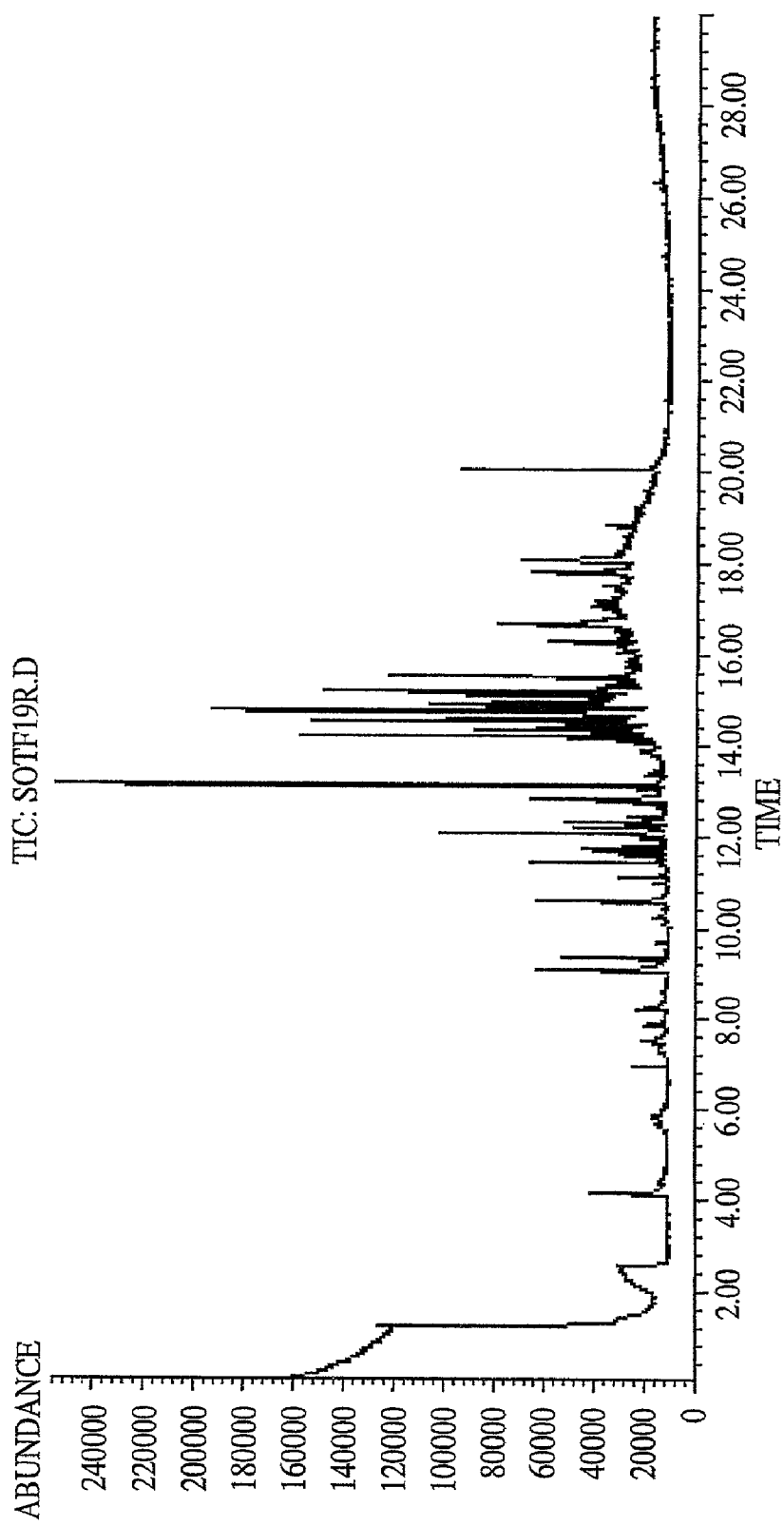
FIG. 5 is a GC/MS graph of a the purified stabilized and cross-linked waxy corn starch of FIG. 4.

The volatile components of the base starch and the purified starch were examined by GC/MS as described in the test protocols of this specification. FIG. 4 is the GC/MS of the unpurified starch and FIG. 5 is the GC/MS of the purified starch. The two gas chromatograms show that the overall amount of volatile compounds was significantly reduced in the purified starch. Table 2 gives the concentration of some volatile compounds which cause undesirable odors for the base starch and its corresponding purified starch.

TABLE 2

Concentration of Selected Volatile Compounds in Starch Sample

| Compound | Retention Time [min] | Concentration in Base Starch [ppb] | Concentration in Purified Starch [pbb] |
|---|---|---|---|
| Hexanal | 4.17 | 166 | 7 |
| 2-Heptanone | 5.69 | 81 | 3 |
| Trimethylbenzene | 7.4 | 16 | 0 |
| Nonanal | 9.17 | 39 | 19 |
| BHT-aldehyde | 15.25 | 518 | 22 |

The removal of compounds causing unwanted flavor and odor from the base starch was confirmed in by a large panel using the Triangle Test and by a small expert panel. In the large panel, 17 out of 37 panelists detected a difference between the samples and rated the purified starch as cleaner in taste. The statistical evaluation showed that the starch tasted significantly cleaner at a 90% significance level. In the expert panel all 6 panelists rated the purified starch as cleaner tasting compared to the base starch.

Example 2

Preparation of a purified acetylated starch adipate. A waxy corn starch, modified with acetic adipic mixed anhydride, (350.4 g, Colflo67® starch, available from National Starch and Chemical, Bridgewater, N.J., US) was loaded in the 600 ml extraction vessel of the supercritical $CO_2$ extraction unit (model Spe-ed SFE, available from Applied Separations Co.). The starch was pre-heated to 80° C. and $CO_2$ was pumped into the vessel until a pressure of 620 bar (62.0 MPa) was attained. The exact process details for the subsequent static and dynamic extraction are described in Table 3.

TABLE 3

Static and Dynamic Extraction Process Details

| Time [min] | $CO_2$ flow [l/min] | Temperature [° C.] | Pressure [bar] | Cumulated extract [g] |
|---|---|---|---|---|
| 0 | 6 | 80 | 620 | 0.0 |
| 10 | Static | 80 | 620 | 0.28 |
| 20 | 6 | 80 | 620 | |
| 35 | Static | 80 | 620 | 0.5 |
| 45 | 6 | 80 | 620 | |
| 55 | Static | 80 | 620 | 0.85 |
| 55–75 | De-pressurize | 80 | — | 0.89 |

Based on these operating conditions the overall solvent to feed ratio was 1.13.

Figure 6:
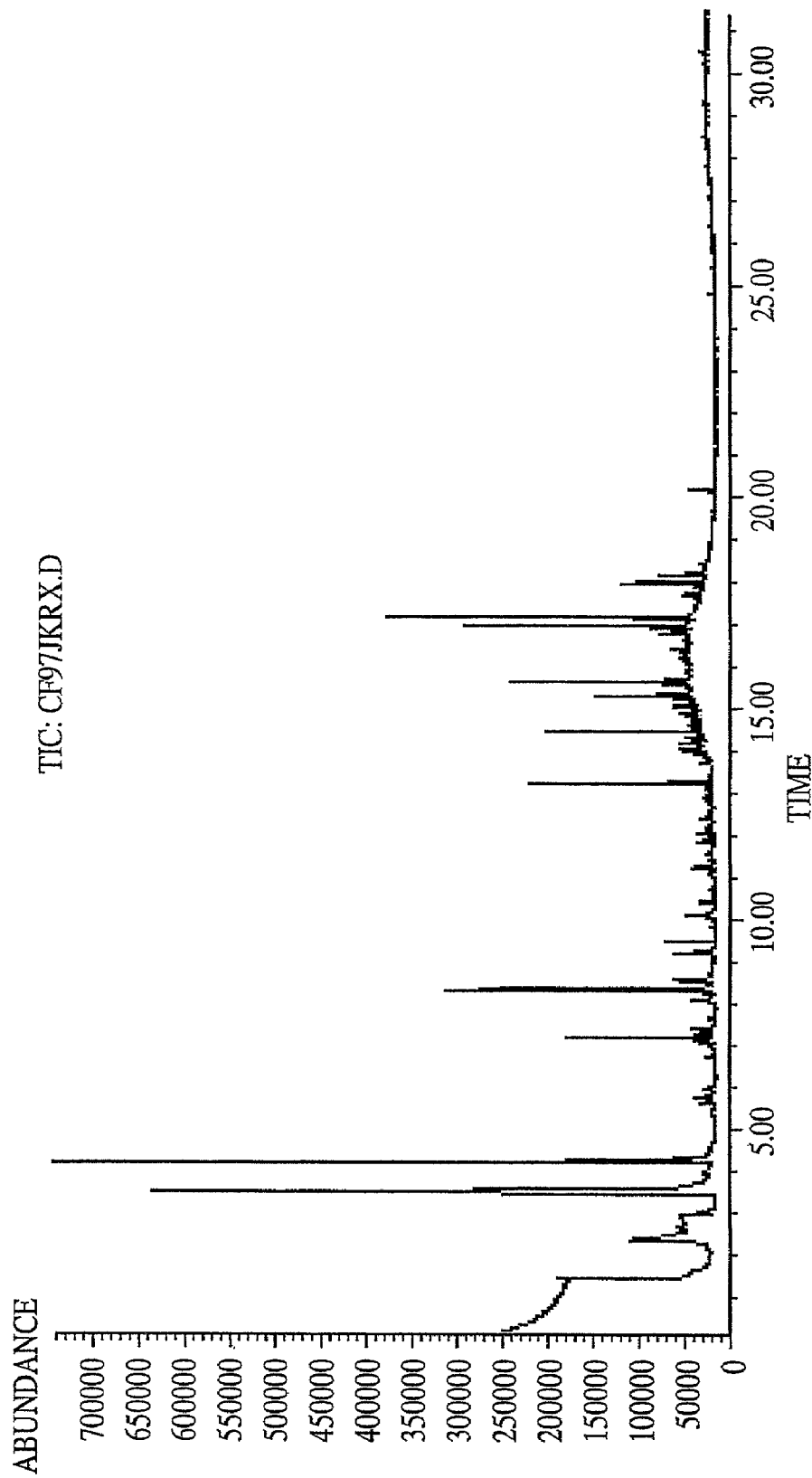
FIG. 6 is a GC/MS graph of waxy corn starch, modified with acetic adipic mixed anhydride.
Figure 7:
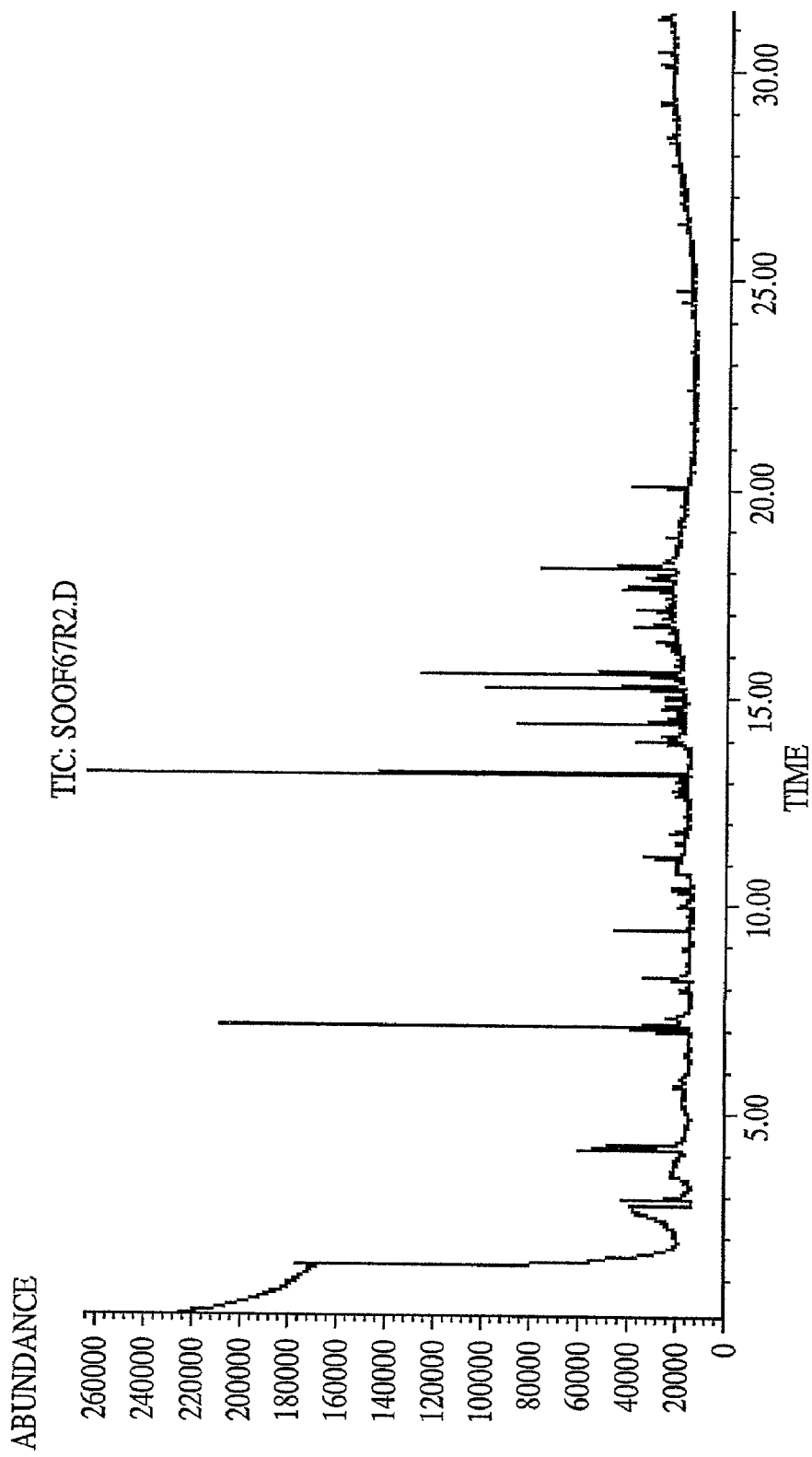
FIG. 7 is a GC/MS graph of the purified waxy corn starch, modified with acetic adipic mixed anhydride, of FIG. 6.

The volatile components of the base starch and the purified starch were examined by GC/MS as described in the test protocols of this specification. FIG. 6 is the GC/MS of the unpurified starch and FIG. 7 is the GC/MS of the purified starch. The two gas chromatograms show that the overall amount of volatile compounds was significantly reduced in the purified starch. Table 4 gives the concentration of some volatile compounds which cause undesirable odors and flavors in the base starch and its corresponding purified starch. The acetic acid residues, which cause the typical vinegar-like off-flavor and off-odor in this product, were reduced significantly in the purified starch.

TABLE 4

Concentration of Selected Volatile Compounds in the Starches

| Compound | Retention Time [min] | Concentration in Base Starch [ppb] | Concentration in Purified starch [pbb] |
|---|---|---|---|
| Acetic acid | 3.47 | 442 | 27 |
| Hexanal | 4.17 | 236 | 21 |
| 2-Heptanone | 5.69 | 10 | 4 |
| Heptanal | 5.89 | 8 | 1 |
| Nonanal | 9.17 | 16 | 0 |

The removal of the off-flavor and off-odor causing compounds was confirmed by the large panel (Triangle Test) and by the small expert panel. In the expert panel all 6 panelists rated the purified starch as cleaner compared to the base starch. In the large panel, 16 out of 30 panelists detected a difference between the samples and rated the purified starch as cleaner in taste. The statistical evaluation showed that the starch is significantly cleaner at a 95% significance level.

Example 3

An acid converted, cold water soluble, high amylose starch for use in yogurt was treated via solid-matrix supercritical $CO_2$ and compared against the same untreated starch for clean taste when used in yogurt. Sample A was untreated, Sample B was treated at 80° C. and 620 bar, and Sample C was treated at 60° C. and 345 bar. Yogurts were prepared containing the treated and un-treated starch and tested for cleanness of taste by an expert taste panel. The yogurts containing the supercritical $CO_2$ treated starches, Samples B and C, were both characterized by the expert panel as significantly cleaner in taste compared to Sample A, the yogurt containing the un-treated starch; Sample B was characterized as having the cleanest taste of the three.

We claim:

1. A process for extracting components from starch comprising:
   (i) contacting the starch with a supercritical fluid or liquid phase fluid for a sufficient length of time and at a sufficient temperature and pressure effective to dissolve the components in the supercritical fluid or liquid phase fluid without substantially changing the physical structure of the starch; and
   (ii) removing the supercritical fluid or liquid phase fluid containing the dissolved components.

2. The process of claim 1 in which the extraction is achieved via countercurrent column method.

3. The process of claim 1 in which the extraction is achieved via the solid matrix method.

4. The process of claim 1 in which the extraction is achieved via the completely mixed vessel method.

5. The process of claim 1 in which step (i) comprises contacting the starch with the supercritical or liquid phase fluid in combination with a co-solvent.

6. The process of claim 5 in which the co-solvent is ethanol.

7. The process according to any one of claims 1 through 6 in which the extraction is conducted with a supercritical fluid or liquid fluid and the fluid is $CO_2$.

8. The process according to any one of claims 1 through 6 in which the extraction is conducted with a supercritical fluid at pressures of greater than 300 bar (30.0 MPa) and temperatures of between about 80° to about 120° C.

9. The process according to any one of claims 1 through 6 in which the extraction is conducted with supercritical $CO_2$ at pressures of greater than 300 bar (30.0 MPa) and temperatures of between about 80° to about 120° C.

10. The process according to any one of claims 1 through 6 in which the extraction is conducted with a supercritical fluid at pressures of greater than 600 bar (60.0 MPa) and temperatures of between about 80° to about 120° C.

11. The process according to any one of claims 1 through 6 in which the extraction is conducted with supercritical $CO_2$ at pressures of greater than 600 bar (60.0 MPa) and temperatures of between about 80° to about 120° C.

* * * * *